United States Patent
Min et al.

(10) Patent No.: US 7,356,199 B2
(45) Date of Patent: Apr. 8, 2008

(54) MOBILE COMMUNICATION TERMINAL EQUIPPED WITH CAMERA HAVING IMAGE DISTORTION COMPENSATION FUNCTION

(75) Inventors: Dong-Uk Min, Seoul (KR); Bo-Hong Seo, Seoul (KR)

(73) Assignee: Curitel Communications, Inc., Seoul (KR)

( * ) Notice: Subject to any disclaimer, the term of this patent is extended or adjusted under 35 U.S.C. 154(b) by 625 days.

(21) Appl. No.: 11/020,262

(22) Filed: Dec. 27, 2004

(65) Prior Publication Data

US 2005/0213844 A1    Sep. 29, 2005

(30) Foreign Application Priority Data

Mar. 29, 2004    (KR) .................. 10-2004-0021268

(51) Int. Cl.
*G06K 9/40* (2006.01)
(52) U.S. Cl. .............. 382/275; 345/603; 345/604; 345/647
(58) Field of Classification Search ......... 345/603, 345/604, 647, FOR. 173; 353/69; 382/275; 398/159, 193, 194
See application file for complete search history.

(56) References Cited

U.S. PATENT DOCUMENTS 6,181,376 B1 *  1/2001  Rashkovskiy et al. ...... 348/273
6,655,861 B2 * 12/2003  Yamakawa ................... 400/76
2002/0191085 A1 * 12/2002  Jaspers ..................... 348/223.1
2003/0041329 A1 *  2/2003  Bassett ........................ 725/105

FOREIGN PATENT DOCUMENTS

KR    2001-0043406    5/2001

* cited by examiner

*Primary Examiner*—Matthew C. Bella
*Assistant Examiner*—G. F. Cunningham
(74) *Attorney, Agent, or Firm*—Oblon, Spivak, McClelland, Maier & Neustadt, P.C.

(57) ABSTRACT

Disclosed herein is a mobile communication terminal equipped with a camera having an image distortion compensation function which compensates image distortion created by a luminance difference between pixels in the vicinity of a central portion of a pixel array of an image sensor and pixels in the vicinity of an outer portion of a pixel array of the image sensor by detecting a Y-component value of the central pixel of the pixel array of the image sensor and Y-component values of the pixels located diagonally to the central pixel, comparing the Y-component value of the central pixel with the Y-component values of the pixels located diagonally to the central pixel, generating compensation values for compensating signal distortion in each of the pixels located diagonally to the central pixel according to the comparison result, and outputting a distortion compensation command, together with the compensation values, to the ISP (image signal processor).

20 Claims, 5 Drawing Sheets

MOBILE COMMUNICATION TERMINAL EQUIPPED WITH CAMERA HAVING IMAGE DISTORTION COMPENSATION FUNCTION

This application claims the priority of Korean Patent Application No. 2004-21268, filed on Mar. 29, 2004, in the Korean Intellectual Property Office, the disclosure of which is incorporated herein in its entirety by reference.

BACKGROUND OF THE INVENTION

1. Field of the Invention

The present invention relates to a mobile communication terminal equipped with a camera having an image distortion compensation function and, more particularly, to a mobile communication terminal equipped with a camera having an image distortion compensation function which compensates image distortion caused by optical devices including camera lenses of the mobile communication terminal and the geometric arrangement of a pixel array of an image sensor.

2. Description of Related Art

When a white light is photographed under darkroom conditions using a mobile communication terminal equipped with a camera, an image viewed on a display has a white color in theory. However, as the camera module equipped into the mobile communication terminal becomes increasingly smaller, the image actually has a color different from the white color in the vicinity of the corners of a pixel array of an image sensor in the camera module due to optical devices including microlenses of the mobile communication terminal and the geometric arrangement of the pixel array of the image sensor.

That is, pixels in the vicinity of a central portion of the pixel array of the image sensor and pixels in the vicinity of an outer portion of the pixel array of the image sensor are exposed to a light source at different locations due to a difference in the resolution of the camera lens or the arrangement of the image sensor. Such a minute difference in location causes occurrence of a difference in luminance and thereby a difference in light wavelength. Consequently, light components refracted at different angles through the microlenses cause a deterioration in color distinction and a distortion in image, which leads to a deterioration in image quality.

Figure 4:
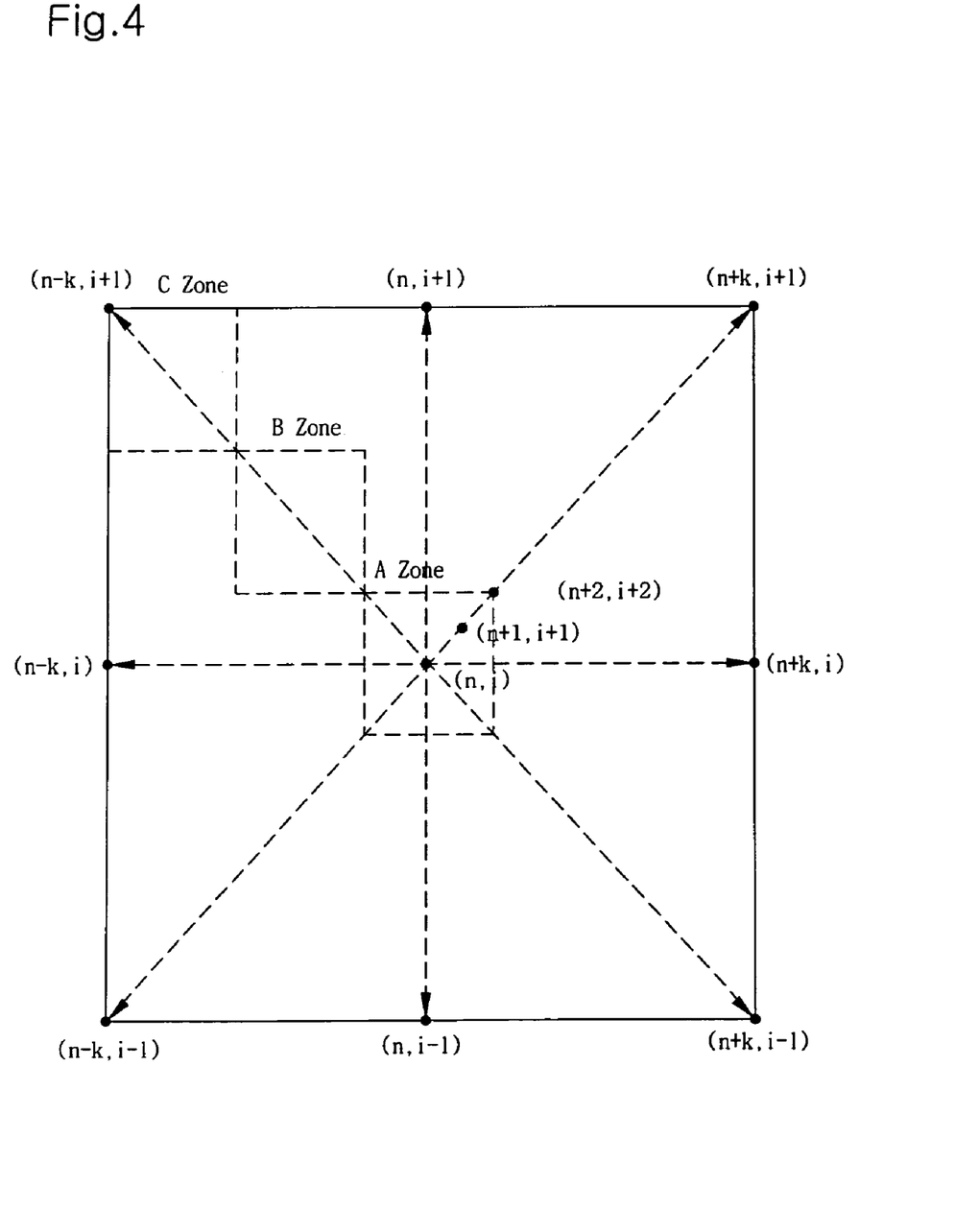
FIG. 4 is an illustrative diagram showing a pixel array of an image sensor.
Figure 5:
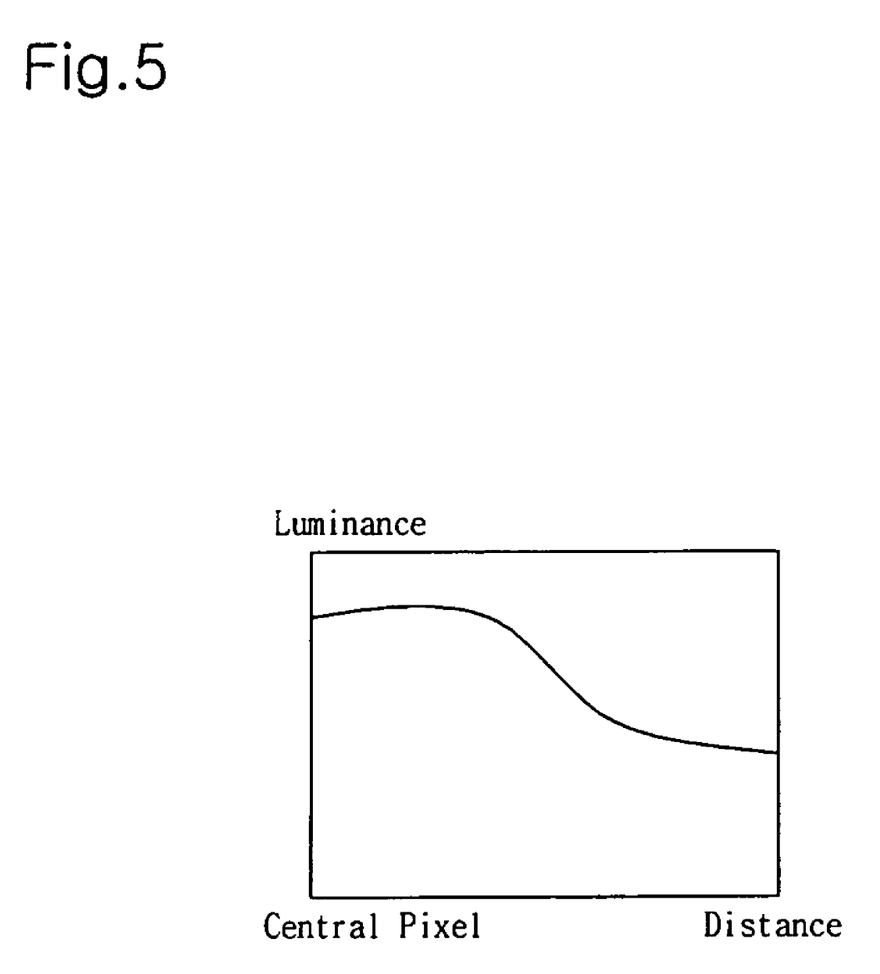
FIG. 5 is a graph showing a luminance characteristic depending on distance from a central pixel of a pixel array of an image sensor.

FIG. 4 is an illustrative diagram showing the pixel array of the image sensor. FIG. 5 is a graph showing a luminance characteristic depending on distance from a central pixel of the pixel array of the image sensor. As can be seen in FIG. 5, the further a pixel is located from the central pixel of the pixel array of the image sensor, the lower luminance value the pixel has.

SUMMARY OF THE INVENTION

The present invention provides a mobile communication terminal equipped with a camera having an image distortion compensation function that has effectively compensated image distortion created by a luminance difference between pixels in the vicinity of a central portion of a pixel array of an image sensor and pixels in the vicinity of an outer portion of the pixel array of the image sensor, which is caused by a difference in the resolution of a camera lens or the arrangement of the image sensor.

In accordance with an aspect of the present invention, there is provided a mobile communication terminal equipped with a camera having an image distortion compensation function, comprising: an image sensor for converting an imaging signal formed by light incident through a lens to Raw Bayer RGB format data; an ISP for converting the Raw Bayer RGB format data to RGB format data, which in turn is converted to YUV format data suitable for a display in the mobile communication terminal; and a back-end chip for processing the YUV format data output from the ISP to display a photographed image on an LCD of the mobile communication terminal, wherein the back-end chip includes an image distortion compensation module comprising: a detection unit for detecting a Y-component value of a central pixel of a pixel array of the image sensor and Y-component values of pixels located diagonally to the central pixel; a comparison unit for comparing the Y-component value of the central pixel with the Y-component values of the pixels located diagonally to the central pixel; a compensation value generation unit for generating compensation values for compensating Y-component signal distortion in each of the pixels located diagonally to the central pixel according to a comparison result from the comparison unit; and a distortion compensation processing unit for outputting a distortion compensation command, together with the compensation values generated by the compensation value generation unit, to the ISP.

The image distortion compensation module may further comprise a compensation value storage unit for storing the compensation values generated by the compensation value generation unit.

The comparison unit may compare the Y-component value of the central pixel with Y-component values of pixels or a group of pixels selected from the pixels located diagonally to the central pixel.

The compensation values generated by the compensation value generation unit may further comprise values for compensating distortions in U-component and V-component signals of each of the pixels located diagonally to the central pixel.

The ISP may compensate image distortions in the pixels located diagonally to the central pixel of the pixel array of the image sensor according to the compensation command from the image distortion compensation module.

A communication between the distortion compensation processing unit and the ISP may be conducted via an IIC bus.

The back-end chip may be a DSP or an MSM.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Exemplary embodiments in accordance with the present invention will now be described in detail with reference to the accompanying drawings.

Figure 1:
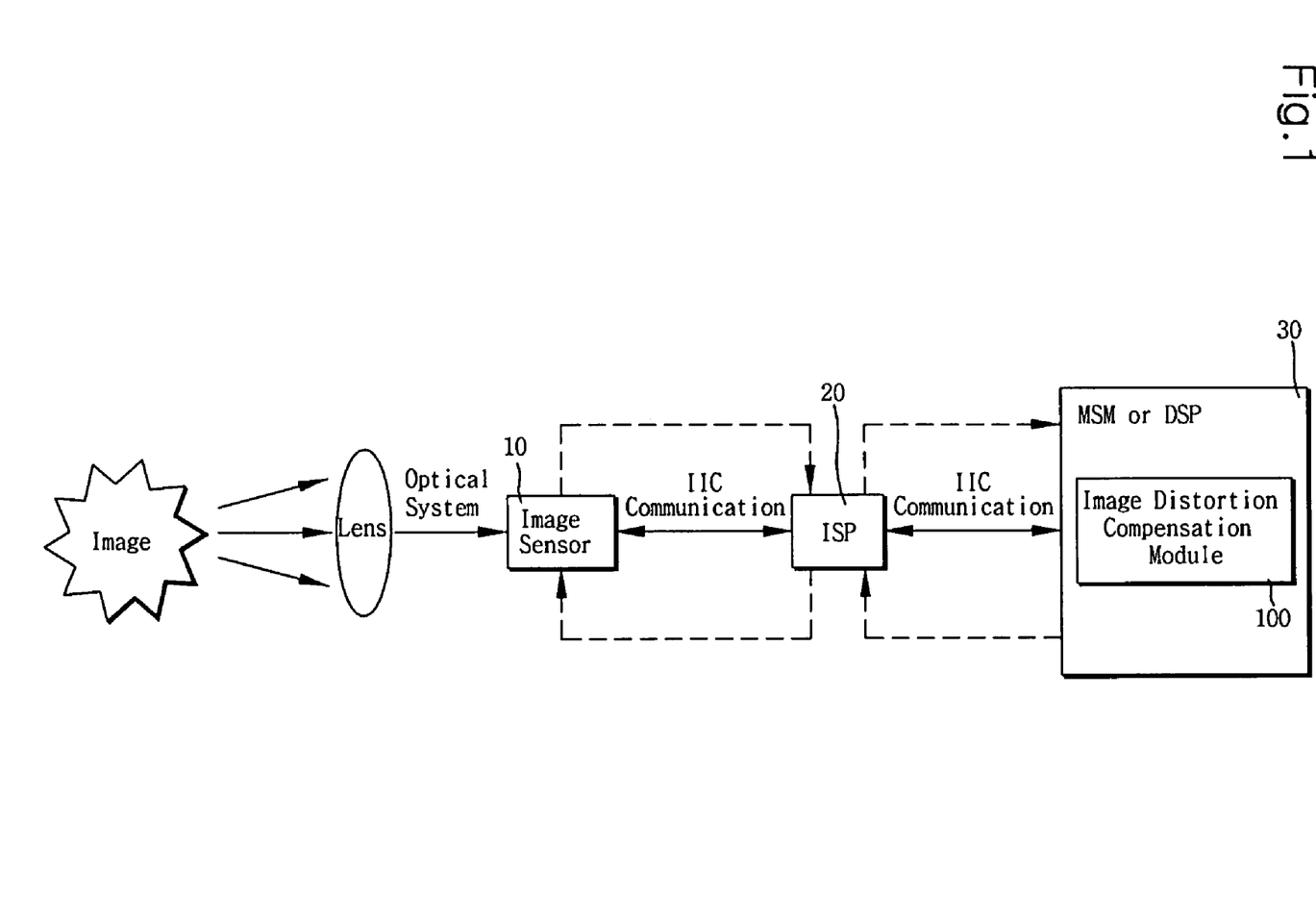
FIG. 1 is a schematic diagram showing a camera processing module for a mobile communication terminal equipped with a camera having an image distortion compensation function in accordance with the present invention.

FIG. 1 is a schematic diagram showing a camera processing module for a mobile communication terminal equipped with a camera having an image distortion compensation function in accordance with the present invention.

The mobile communication terminal equipped with a camera typically comprises an image sensor 10, an image signal processor (ISP) 20, and a back-end chip 30.

The image sensor 10 converts an imaging signal, which is formed by light incident through a lens, to Raw Bayer RGB format data.

The ISP 20 converts the Raw Bayer RGB format data to RGB format data, and in turn converts the RGB format data to YUV format data suitable for a display in the mobile communication terminal.

The back-end chip 30 is responsible for controlling a camera module. That is, the back-end chip 30 processes the YUV format data outputted from the ISP to display a photographed image on a liquid crystal display (LCD) in the mobile communication terminal. Examples of the back-end chip 30 include a mobile station modem (MSM) or a digital signal processor (DSP).

That is, when an image is photographed using the mobile communication terminal equipped with a camera, the image sensor 10 outputs the Raw Bayer RGB format data according to an imaging signal formed by light incident through a lens. The ISP 20 receives and converts the Raw Bayer RGB format data to actual RGB format data. In addition, the ISP 20 converts the RGB format data to YUV format data suitable for a display in the mobile communication terminal, i.e., YUV format data required by the back-end chip 30 for image processing.

Next, the back-end chip 30 processes the received YUV format data to display a photographed image on the LCD in the mobile communication terminal.

In this case, image distortion occurs due to a luminance difference between pixels in the vicinity of a central portion of a pixel array of the image sensor and pixels in the vicinity of an outer portion of a pixel array of the image sensor, which is caused by a difference in the resolution of a camera lens or the arrangement of the image sensor. Consequently, this leads to a substantial decrease in resolution of the image on the display.

The mobile communication terminal equipped with a camera having an image distortion compensation function in accordance with the present invention has solved the above-mentioned problem using an image distortion compensation module 100.

The image distortion compensation module 100, which is a software executed within the back-end chip 30, improves image distortion occurring due to a luminance difference between pixels in the vicinity of a central portion of a pixel array of the image sensor and pixels in the vicinity of an outer portion of a pixel array of the image sensor, which is caused by a difference in the resolution of a camera lens or the arrangement of the image sensor.

Figure 2:
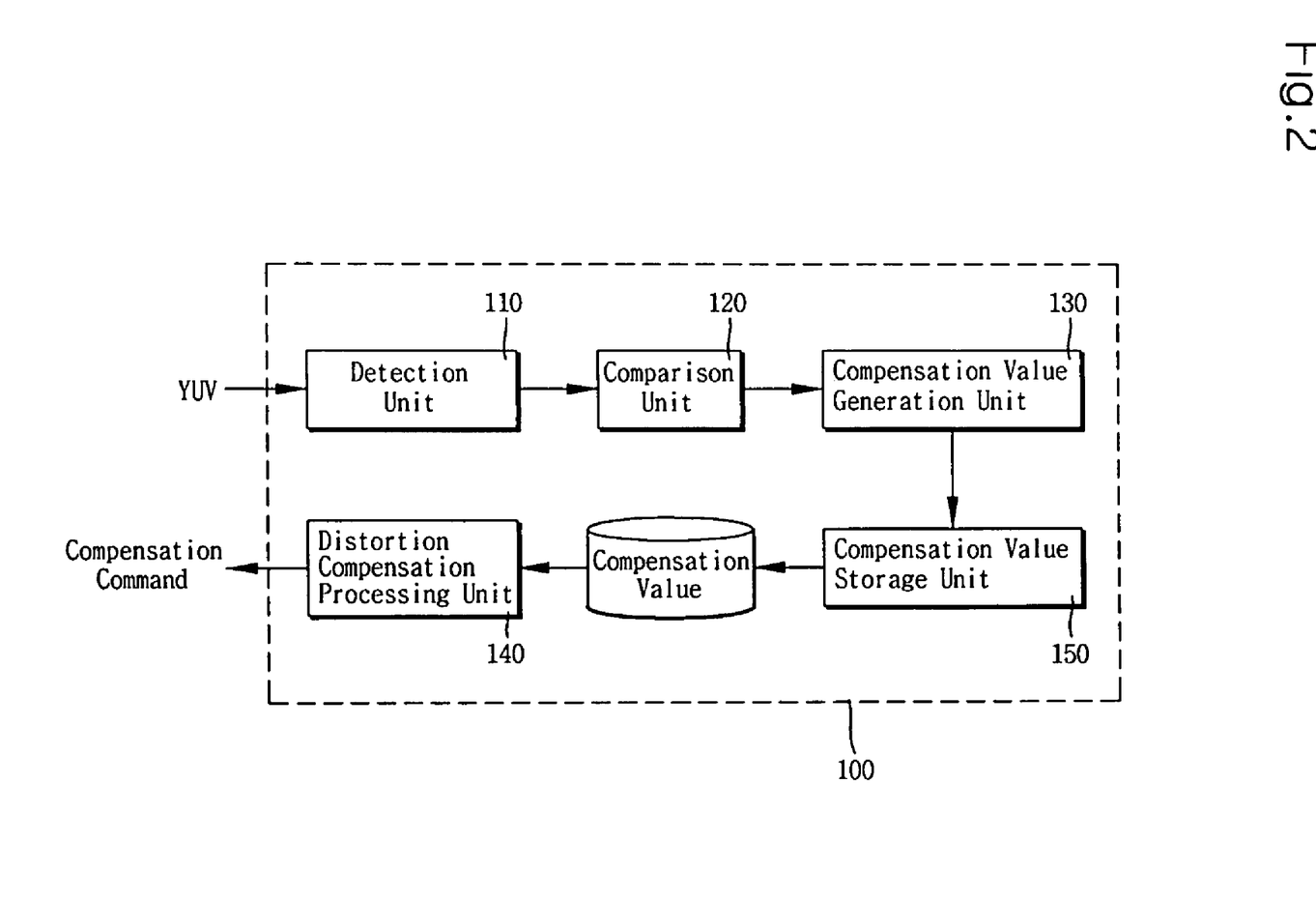
FIG. 2 is a block diagram showing an image distortion compensation module in a mobile communication terminal equipped with a camera having an image distortion compensation function in accordance with an embodiment of the present invention.

FIG. 2 is a block diagram showing the image distortion compensation module 100 in a mobile communication terminal equipped with a camera having an image distortion compensation function in accordance with an embodiment of the present invention.

The image distortion compensation module 100 comprises a detection unit 110, a comparison unit 120, a compensation value generation unit 130, and a distortion compensation processing unit 140. The image distortion compensation module 100 further comprises a compensation value storage unit 150.

The detection unit 110 detects a Y-component value of a central pixel in a pixel array of the image sensor 10 and Y-component values of pixels located diagonally to the central pixel.

Referring to FIG. 4 showing the pixel array of the image sensor, there are a plurality of pixels from a central pixel (n, i) to a pixel (n−k, i+1) in a top-left direction, to a pixel (n+k, i+1) in a top-right direction, to a pixel (n−k, i−1) in a bottom-left direction, and to a pixel (n+k, i−1) in a bottom-right.

The image distortion compensation module 100 detects through the detection unit 110 both a Y-component value of a central pixel in the pixel array of the image sensor 10 and Y-component values pixels located diagonally to the central pixel from the YUV format data outputted from the ISP 20.

Hexa values of the luminance signal Y range from 0 to 255, with 0 representing an illuminance of 0 lux and 255 representing over 5000 lux.

The comparison unit 120 compares the Y-component value of the central pixel detected by the detection unit 110 with the Y-component values of the pixels located diagonally to the central pixel.

When light emitted from a white light source is incident through a lens under darkroom conditions in order to improve image distortion in the pixels located diagonally to the central pixel of the pixel array of the image sensor, pixels located at the corners distant from the central pixel have different luminance signal Y values due to a luminance difference caused by a difference in the resolution of the lens or the arrangement of the image sensor.

The image distortion compensation module 100 detects both the Y-component value of the central pixel and the Y-component values of the pixels located diagonally to the central pixel by means of the detection unit 110. As shown in FIG. 5, the further a pixel is located from the central pixel, the lower luminance signal Y value the pixel has.

For instance, if a luminance signal Y value of the central pixel is detected to be 170 and a luminance signal Y value of a certain pixel located diagonally to the central pixel is detected to be 150, the pixel located diagonally to the central pixel is compensated with a compensation value of 20.

That is, the image distortion compensation module 100 compares the Y-component value of the central pixel with the Y-component values of the pixels located diagonally to the central pixel by means of the comparison unit 120, and carries out a compensating process for pixels having Y-component values different from the Y-component value of the central pixel.

The compensation value generation unit 130 generates a compensation value for compensating a distortion generated in the Y-component signal of each of the pixels located diagonally to the central pixel according to the comparison result of the comparison unit 120.

That is, if the Y-component value of the central pixel and the Y-component values of the pixels located diagonally to the central pixel are different from each other, the image distortion compensation module 100 obtains a compensation value of each of the pixels by subtracting the Y-component values of pixels located diagonally to the central pixel from the Y-component value of the central pixel.

For instance, if the Y-component value of the central pixel is 170 and a Y-component value of a certain pixel located diagonally to the central pixel is 150, the compensation value for the pixel located diagonally to the central pixel is 20 (170−150=20).

The distortion compensation processing unit 140 outputs a distortion compensation command, together with a compensation value generated in the compensation value generation unit 130, to the ISP 20.

That is, when the compensation value generation unit 130 generates a compensation value for each of the pixels located diagonally to the central pixel, the image distortion compensation module 100 outputs a distortion compensation command, together with the compensation value for each of the pixels, to the ISP 20 via the distortion compensation processing unit 140, thereby improving distortions in the pixels located at the corners distant from the central pixel of the pixel array of the image sensor 10.

On the other hand, the compensation value storage unit 150 stores a compensation value generated in the compensation value generation unit 130.

It is not preferable in terms of speed that the compensation value for improving the above-mentioned image distortion is generated and an image distortion compensation process is carried out using the compensation value each time images are photographed, since comparison operations should be performed and thus internal processes become complicated as the number of pixels to be compared increases.

Accordingly, the mobile communication terminal equipped with a camera is preferably configured so that the distortion generated in the pixels located at the corners distant from the central pixel of the pixel array of the image sensor 10 is eliminated by generating the compensation value for compensating image distortion generated in each of the pixels located diagonally to the central pixel by means of the image distortion compensation module 100 under darkroom conditions during the performance test before the mobile communication terminal is released, storing the generated compensation value in the compensation value storage unit 150, and outputting a distortion compensation command, together with the compensation value stored in the compensation value storage unit 150, to the ISP 20 each time images are photographed.

On the other hand, in accordance with another embodiment of the present invention, the comparison unit 120 in the image distortion compensation module 100 may be configured to compare the Y-component value of the central pixel with Y-component values of pixels or a group of pixels selected from the pixels located diagonally to the central pixel.

That is, since adjacent pixels typically have almost the same luminance component Y value, the present embodiment compares the Y-component value of the central pixel with Y-component values of pixels selected at predetermined intervals or pixels included in a group of pixels selected from the pixels located diagonally to the central pixel, thereby minimizing the operation time.

On the other hand, in accordance with another embodiment of the present invention, the compensation value generated in the compensation value generation unit 130 in the image distortion compensation module 100 preferably further includes values for compensating distortions in U-component and V-component signals of each of the pixels located diagonally to the central pixel.

In a YUV format signal, Y stands for the luminance component, and U and V are the chrominance components.

The relation between the RGB and YUV signals is as follows:

$Y = 0.299R + 0.587G + 0.114B$,
$U = (B − Y) \times 0.492$,
$V = (R − Y) \times 0.877$.

The chrominance components U and V can be obtained when the luminance component Y is determined. Accordingly, the compensation values for the chrominance components U and V are determined when the compensation value for the luminance component Y is determined.

While the compensation values for the chrominance components U and V may be determined in the ISP 20, it is preferable to be determined in the compensation value generation unit 130 provided in the image distortion compensation module 100.

That is, the image distortion compensation module 100 further generates values for compensating distortions in the U-component and V-component signals of the pixels located diagonally to the central pixel in addition to the compensation values for the Y-components of the pixels located diagonally to the central pixel by means of the compensation value generation unit 130.

The values for compensating the distortions in the U-component and V-component signals are transmitted to the ISP 20 together with the distortion compensation command.

On the other hand, the ISP 20 acts to compensate image distortion in the pixels located diagonally to the central pixel of the pixel array of the image sensor according to the compensation command from the image distortion compensation module 100. At this time, a communication between the distortion compensation processing unit 140 and the ISP 20 is preferably conducted via an IIC (inter-integrated circuit) bus.

The IIC bus, which is first introduced by Philips Corporation, is a bi-directional two wire clock synchronous bus.

Figure 3:
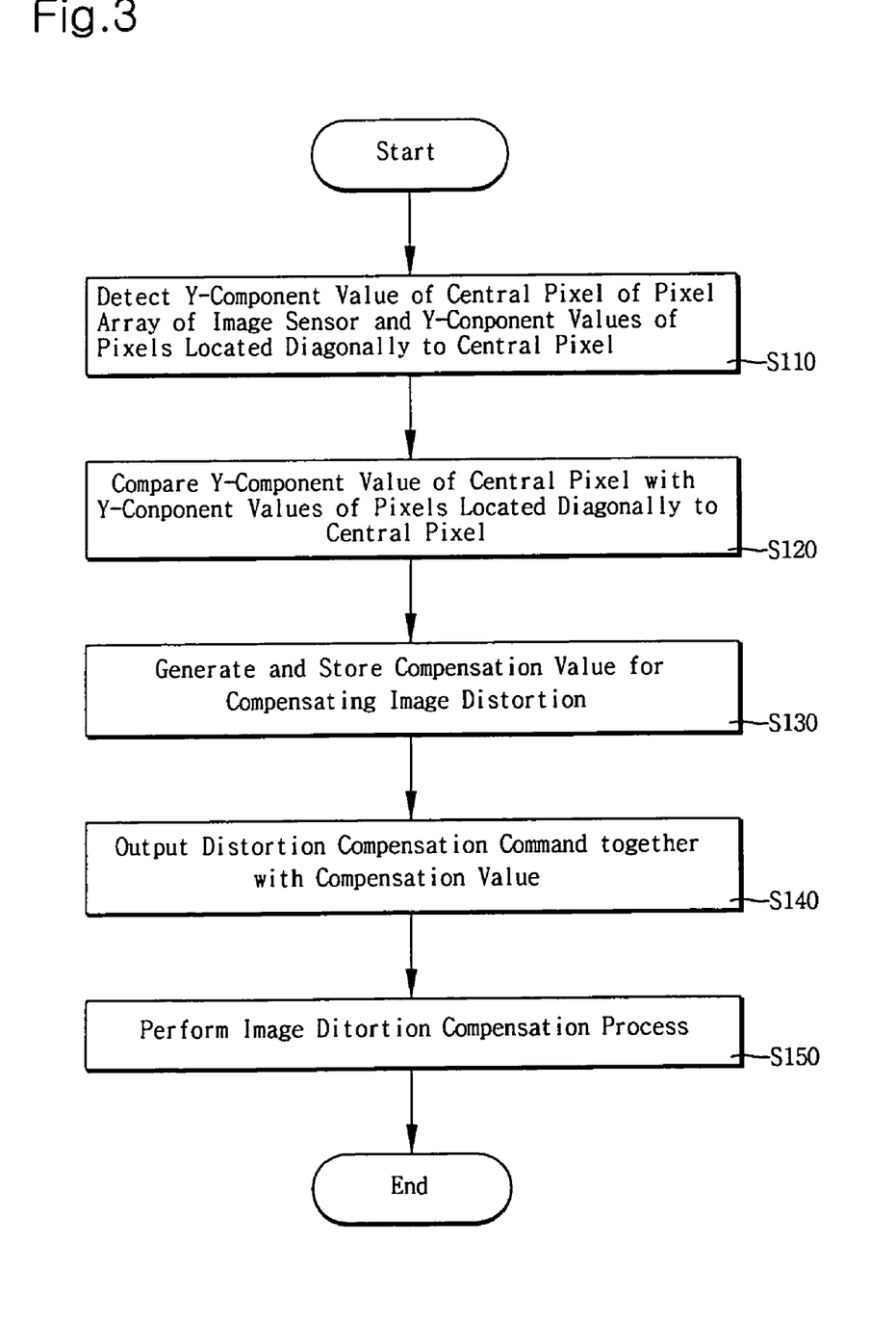
FIG. 3 is a flowchart showing an image distortion compensation process in a mobile communication terminal equipped with a camera having an image distortion compensation function in accordance with the present invention.

FIG. 3 is a flowchart showing an image distortion compensation process in a mobile communication terminal equipped with a camera having an image distortion compensation function in accordance with the present invention.

In step S110, the image distortion compensation module 100 detects a Y-component value of a central pixel of a pixel array of an image sensor and Y-component values of pixels located diagonally to the central pixel by means of the detection unit 110.

In step S120, the image distortion compensation module 100 compares the detected Y-component value of the central pixel with the detected Y-component values of the pixels located diagonally to the central pixel by means of the comparison unit 120.

In step S130, the image distortion compensation module 100 generates a compensation value for compensating signal distortion in each of the pixels located diagonally to the central pixel by means of the compensation value generation unit 130 according to a comparison between the Y-component value of the central pixel and the Y-component values of the pixels located diagonally to the central pixel, and stores the generated compensation values in the compensation value storage unit 150.

In step S140, when an image is photographed by a camera module, the image distortion compensation module 100 outputs a distortion compensation command, together with the compensation value for compensating signal distortion in each of the pixels located diagonally to the central pixel, to the ISP 20 through the distortion compensation processing unit 140.

Accordingly, the ISP 20 effectively compensates image distortion created by a luminance difference between pixels in the vicinity of the central portion of the pixel array of the image sensor and the pixels in the vicinity of an outer portion of the pixel array of the image sensor, which is caused by a difference in the resolution of the camera lens or the arrangement of the image sensor, by applying the compensation values to each of the pixels located diagonally to the central pixel of the pixel array of the image sensor 10 according to the distortion compensation command.

Accordingly, it is possible to provide a mobile communication terminal equipped with a camera having an image distortion compensation function in accordance with the present invention.

In accordance with the present invention, it is possible to provide a mobile communication terminal equipped with a camera having an image distortion compensation function that compensates image distortion created by a luminance difference between pixels in the vicinity of a central portion of a pixel array of an image sensor and pixels in the vicinity of an outer portion of the pixel array of the image sensor by detecting a Y-component value of the central pixel of the pixel array of the image sensor and Y-component values of pixels located diagonally to the central pixel, comparing the Y-component value of the central pixel with the Y-component values of the pixels located diagonally to the central pixel, generating compensation values for compensating signal distortion in each of the pixels located diagonally to the central pixel according to the comparison result, and outputting a distortion compensation command, together with the compensation values, to the ISP.

While the present invention has been described with reference to exemplary embodiments thereof, it will be understood by those skilled in the art that various changes in form and details may be made therein without departing from the scope of the present invention as defined by the following claims.

What is claimed is:

1. A mobile communication terminal equipped with a camera having an image distortion compensation function, comprising:
   an image sensor for converting an imaging signal formed by light incident through a lens to Raw Bayer RGB format data;
   an ISP (image signal processor) for converting the Raw Bayer RGB format data to RGB format data, which in turn is converted to YUV format data suitable for a display in the mobile communication terminal; and
   a back-end chip for processing the YUV format data output from the ISP to display a photographed image on an LCD (liquid crystal display) of the mobile communication terminal,
   wherein the back-end chip includes an image distortion compensation module comprising:
   a detection unit for detecting a Y-component value of a central pixel of a pixel array of the image sensor and Y-component values of pixels located diagonally to the central pixel;
   a comparison unit for comparing the Y-component value of the central pixel with the Y-component values of the pixels located diagonally to the central pixel;
   a compensation value generation unit for generating compensation values for compensating Y-component signal distortion in each of the pixels located diagonally to the central pixel according to a comparison result from the comparison unit; and
   a distortion compensation processing unit for outputting a distortion compensation command, together with the compensation values generated by the compensation value generation unit, to the ISP.

2. The mobile communication terminal of claim 1, wherein the image distortion compensation module further comprises a compensation value storage unit for storing the compensation values generated by the compensation value generation unit.

3. The mobile communication terminal of claim 2, wherein the comparison unit compares the Y-component value of the central pixel with Y-component values of pixels or a group of pixels selected from the pixels located diagonally to the central pixel.

4. The mobile communication terminal of claim 3, wherein the compensation values generated by the compensation value generation unit further comprise values for compensating distortions in U-component and V-component signals of each of the pixels located diagonally to the central pixel.

5. The mobile communication terminal of claim 1, wherein the ISP compensates image distortions in the pixels located diagonally to the central pixel of the pixel array of the image sensor according to the compensation command from the image distortion compensation module.

6. The mobile communication terminal of claim 2, wherein the ISP compensates image distortions in the pixels located diagonally to the central pixel of the pixel array of the image sensor according to the compensation command from the image distortion compensation module.

7. The mobile communication terminal of claim 3, wherein the ISP compensates image distortions in the pixels located diagonally to the central pixel of the pixel array of the image sensor according to the compensation command from the image distortion compensation module.

8. The mobile communication terminal of claim 4, wherein the ISP compensates image distortions in the pixels located diagonally to the central pixel of the pixel array of the image sensor according to the compensation command from the image distortion compensation module.

9. The mobile communication terminal of claim 5, wherein a communication between the distortion compensation processing unit and the ISP is conducted via an IIC (inter-integrated circuit) bus.

10. The mobile communication terminal of claim 6, wherein a communication between the distortion compensation processing unit and the ISP is conducted via an IIC bus.

11. The mobile communication terminal of claim 7, wherein a communication between the distortion compensation processing unit and the ISP is conducted via an IIC bus.

12. The mobile communication terminal of claim 8, wherein a communication between the distortion compensation processing unit and the ISP is conducted via an IIC bus.

13. The mobile communication terminal of claim 5, wherein the back-end chip is a DSP (digital signal processor).

14. The mobile communication terminal of claim 6, wherein the back-end chip is a DSP.

15. The mobile communication terminal of claim 7, wherein the back-end chip is a DSP.

16. The mobile communication terminal of claim 8, wherein the back-end chip is a DSP.

17. The mobile communication terminal of claim 5, wherein the back-end chip is an MSM (mobile station modem).

18. The mobile communication terminal of claim 6, wherein the back-end chip is an MSM.

19. The mobile communication terminal of claim 7, wherein the back-end chip is an MSM.

20. The mobile communication terminal of claim 8, wherein the back-end chip is an MSM.

* * * * *